(12) United States Patent
Yagawa

(10) Patent No.: US 7,716,488 B2
(45) Date of Patent: *May 11, 2010

(54) TRUSTED TIME STAMPING STORAGE SYSTEM

(75) Inventor: Yuichi Yagawa, San Jose, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/016,626

(22) Filed: Jan. 18, 2008

(65) Prior Publication Data

US 2008/0229113 A1 Sep. 18, 2008

Related U.S. Application Data

(63) Continuation of application No. 10/931,475, filed on Aug. 31, 2004, now Pat. No. 7,340,610.

(51) Int. Cl.
*H04L 9/00* (2006.01)
(52) U.S. Cl. .................. 713/178; 713/155; 726/2; 726/26; 726/27; 711/100; 711/114
(58) Field of Classification Search .................. 713/155, 713/176, 189, 193; 726/2, 26, 27, 30; 711/100, 711/114
See application file for complete search history.

(56) References Cited

U.S. PATENT DOCUMENTS

| | | | |
|---|---|---|---|
| 4,530,054 A * | 7/1985 | Hamstra et al. ............. | 711/133 |
| 5,001,752 A | 3/1991 | Fischer | |
| 5,022,080 A | 6/1991 | Durst et al. | |
| 5,136,646 A | 8/1992 | Haber et al. | |
| 5,136,647 A * | 8/1992 | Haber et al. ................ | 713/178 |
| 5,373,561 A | 12/1994 | Haber et al. | |
| RE034,954 E | 5/1995 | Haber et al. | |
| 5,422,953 A | 6/1995 | Fischer | |
| 5,781,629 A | 7/1998 | Haber et al. | |
| 5,895,493 A * | 4/1999 | Gatica ........................ | 711/147 |
| 5,937,406 A | 8/1999 | Balabine et al. | |
| 5,999,930 A * | 12/1999 | Wolff ........................... | 707/8 |
| 6,189,096 B1 * | 2/2001 | Haverty ....................... | 713/155 |

(Continued)

OTHER PUBLICATIONS

Adams et al. "Internet X.509 Public Key Infrastructure Time-Stamp Protocal (TSP)," The Internet Engineering Task Force (IETF) Network Working Group Request for Comment (RFC) No. 3161 available on line at http://www.ieff.org (Aug. 2001).

*Primary Examiner*—Edan Orgad
*Assistant Examiner*—Yin-Chen Shaw
(74) *Attorney, Agent, or Firm*—Mattingly & Malur, P.C.

(57) ABSTRACT

Data stored in a data storage system is hashed to generate a hash value. The hash value and a request for a time stamp are then sent to a time stamping authority. A time stamp token and/or a time stamp certificate is received from the time stamping authority. The time stamp token includes a time stamp and the hash value, and may be encrypted using a private key of the time stamping authority. The time stamp token and/or time stamp certificate is then stored with, for example, a reference to the data being stored in the data storage system. The time stamp token and/or time stamp certificate may then be used to validate the data being stored and the time stamp.

60 Claims, 10 Drawing Sheets

U.S. PATENT DOCUMENTS

| | | | |
|---|---|---|---|
| 6,330,549 B1 * | 12/2001 | Merkle | 705/51 |
| 6,367,013 B1 * | 4/2002 | Bisbee et al. | 713/178 |
| 6,393,126 B1 | 5/2002 | van der Kaay et al. | |
| 6,470,449 B1 * | 10/2002 | Blandford | 713/178 |
| 6,915,433 B1 | 7/2005 | Barber | |
| 6,931,537 B1 | 8/2005 | Takura et al. | |
| 6,965,998 B1 * | 11/2005 | Peyravian et al. | 713/178 |
| 6,968,512 B2 * | 11/2005 | Duxbury | 715/847 |
| 6,976,165 B1 | 12/2005 | Carpentier et al. | |
| 7,076,573 B2 * | 7/2006 | Allen et al. | 710/17 |
| 7,590,801 B1 * | 9/2009 | Gavarre et al. | 711/114 |
| 2001/0002485 A1 * | 5/2001 | Bisbee et al. | 713/167 |
| 2002/0120851 A1 * | 8/2002 | Clarke | 713/178 |
| 2002/0196685 A1 * | 12/2002 | Topham | 365/200 |
| 2003/0115420 A1 | 6/2003 | Tsirigotis et al. | |
| 2003/0120939 A1 | 6/2003 | Hughes et al. | |
| 2003/0126446 A1 | 7/2003 | Debiez et al. | |
| 2004/0024954 A1 | 2/2004 | Rust | |
| 2004/0054901 A1 | 3/2004 | England et al. | |
| 2004/0143744 A1 | 7/2004 | Margolus et al. | |
| 2004/0177058 A1 * | 9/2004 | Carpentier et al. | 707/1 |
| 2005/0172123 A1 | 8/2005 | Carpentier et al. | |

* cited by examiner

FIG. 2

| ID | TST | TSA Certificate | Data Reference | --- | |
|---|---|---|---|---|---|
| 1 | AAA | BBB | CCC | --- | ~421 |
| 2 | WWW | XXX | YYY | --- | ~422 |
| --- | --- | --- | --- | --- | |

FIG. 10

| ID | TST | TSA Certificate | CDB | --- | |
|---|---|---|---|---|---|
| 1 | AAA | BBB | CCC | --- | ~1021 |
| 2 | XXX | YYY | ZZZ | --- | ~1022 |
| --- | --- | --- | --- | --- | |

1011  1012  1013  1014

TRUSTED TIME STAMPING STORAGE SYSTEM

BACKGROUND OF THE INVENTION

The present invention generally relates to data storage and more specifically to methods and apparatus for providing trusted time stamping in a storage system.

With the increase in the amount of digital data being created and/or modified and moreover used in official and public affairs, it has become more desirable to prove the time that the digital data was created and/or modified. In one example, an internal timer in a computer system may be used to show the time and date that the digital data was created and/or modified. However, the internal timer may be easily changed to reflect a false date or time. Accordingly, the internal timer in the computer system does not provide a trusted date or time to the public.

A time stamp may be provided by a public authority and attached to the data in the computer system. This time stamp is used to prove that the data is as it was at the time when the time stamp was attached to the data. Examples of commercial services that provide time stamps include services provided by Surety, DigiStamp, I.T. Consulancy, Seiko Instruments, Amano, and like. Also, time stamping is standardized as "Simple Protocol (RFC 3161)" by IETF.

More and more data is being preserved for a long period of time in storage systems, such as in Redundant Arrays of Inexpensive Disks (RAID). For example, the U.S. Securities and Exchange Commission (SEC) regulates the exchanges between members, brokers, and dealers to preserve records of all communications with their customers as well as all financial transaction records in a non-erasable format (write once read many (WORM) format) for a certain amount of years under the Securities Exchange Act of 1934, Rule 17 A-4. Also, the National Association of Securities Dealers, Inc. (NASD) has similar regulations found at Rules 3010 and 3110. These regulations require WORM capability in a storage system in that data cannot be erasable or modifiable for a certain periods of time. The data being stored during these time periods also needs to be trusted.

Currently, storage systems use an internal timer to indicate a time data was stored. This suffers from the same problems as discussed above in that the internal timer may be changed to provide a time stamp that is false.

BRIEF SUMMARY OF THE INVENTION

The present invention generally relates to providing trusted time stamping capabilities in a storage system.

In one embodiment, data stored in a storage system is hashed to generate a hash value. The hash value and a request for a time stamp are then sent to a time stamping authority. A time stamp token and/or a time stamp certificate is received from the time stamping authority. The time stamp token includes a time stamp and the hash value, and may be encrypted using a private key of the time stamping authority. The time stamp token and/or time stamp certificate is then stored with, for example, a reference to the data being stored in the data storage system. The time stamp token and/or time stamp certificate may then be used to validate the data being stored and the time stamp.

In one embodiment, a method for validating the time stamp is provided. The method includes receiving a request to validate the time stamp. The reference to the data is then used to access the time stamp token and the data. The accessed data is hashed to generate a second hash value. The time stamp token may be decrypted using a public key of the time stamp authority if it is encrypted. The second hash value is then compared to the hash value found in the time stamp token. The time stamp token is validated based on the comparison. For example, if the hash value found in the time stamp token corresponds to the second hash value, then the time stamped data is validated. Additionally, the time stamp certificate may be used to validate the time stamp token. A party associated with the time stamp certificate may be contacted in order to validate the time stamp token. Accordingly, the time stamp and stored data may be validated.

In one embodiment, a method for providing trusted time stamping in a data storage system is provided. The method comprises: determining data being stored in the data storage system; hashing the data to generate a hash value; sending the hash value and a request for a time stamp to a time stamping authority; receiving a time stamp token from the time stamping authority, the time stamp token comprising a time stamp and the hash value; and storing the time stamp token in the data storage system, the time stamp and hash value providing trusted time stamping for the determined data in data storage system.

In another embodiment, a storage system for providing trusted time stamping is provided. The system comprises: a storage device configured to store data; a data determiner configured to determine data in the storage device; a hasher configured to hash the determined data to generate a hash value; a time stamp requestor configured to send the hash value and a request for a time stamp to a time stamping authority; and a receiver configured to receive a time stamp token from the time stamping authority, the time stamp token comprising a time stamp and the hash value, wherein the storage device is configured to store the time stamp token, the time stamp token providing trusted time stamping for the determined data in the data storage system.

In yet another embodiment, a method for validating a time stamp generated for data being stored in a data storage system is provided. The method comprises: receiving a request to validate a time stamp token received from a time stamping authority; accessing the time stamp token being stored in the data storage system; validating the time stamp token; determining a hash value associated with the time stamp token; accessing data being stored in the data storage system that was time stamped using the time stamp token; hashing the data to generate a second hash value; comparing the hash value included in the time stamp token with the second hash value; validating the data based on the comparison; and if the time stamp token and the data are validated, validating the time stamp.

In yet another embodiment, a method for providing trusted time stamping for commands for a data storage system is provided. The method comprises: determining a command executed in the data storage system; hashing information for the command to generate a hash value; sending the hash value and a request for a time stamp to a time stamping authority; receiving a time stamp token from the time stamping authority, the time stamp token comprising a time stamp and the hash value; and storing the time stamp token in the data storage system, the time stamp and hash value providing trusted time stamping mechanism for the command in the data storage system.

In another embodiment, a storage system for providing trusted time stamping for commands being executed in the storage system is provided. The system comprises: a command determiner configured to determine a command being executed in the storage device; a hasher configured to hash information for the command to generate a hash value; a time stamp requester configured to send the hash value and a request for a time stamp to a time stamping authority; a receiver configured to receive a time stamp token from the time stamping authority, the time stamp token comprising a time stamp and the hash value; and wherein the storage device is configured to store the time stamp token, the time stamp token providing trusted time stamping for the command in the data storage system.

In another embodiment, a method for validating a time stamp generated for a command being executed in a data storage system is provided. The method comprises: receiving a request to validate a time stamp token received from a time stamping authority; accessing the time stamp token being stored in the data storage system; validating the time stamp token; determining a hash value included with the time stamp token; accessing information for the command being stored in the data storage system that was time stamped using the time stamp token; hashing the information for the command to generate a second hash value; comparing the hash value included in the time stamp token with the second hash value; validating the information for the command based on the comparison; and if the time stamp token and the data are validated, validating the time stamp.

In another embodiment, a storage system for providing trusted time stamping for commands being executed in the storage system is provided. The system comprises: a command determiner configured to determine a command being executed in the storage device; a hasher configured to hash information for the command to generate a hash value; a time stamp requestor configured to send the hash value and a request for a time stamp to a time stamping authority; a receiver configured to receive a time stamp token from the time stamping authority, the time stamp token comprising a time stamp and the hash value; and wherein the storage device is configured to store the time stamp token, the time stamp token providing trusted time stamping for the command in the data storage system.

A further understanding of the nature and the advantages of the inventions disclosed herein may be realized by reference of the remaining portions of the specification and the attached drawings.

BRIEF DESCRIPTION OF THE DRAWINGS

FIG. 2 depicts an example of a metadata table according to one embodiment of the present invention;

FIG. 10 depicts an example of a command log table generated for an I/O command according to one embodiment of the present invention.

DETAILED DESCRIPTION OF THE INVENTION

Figure 1:
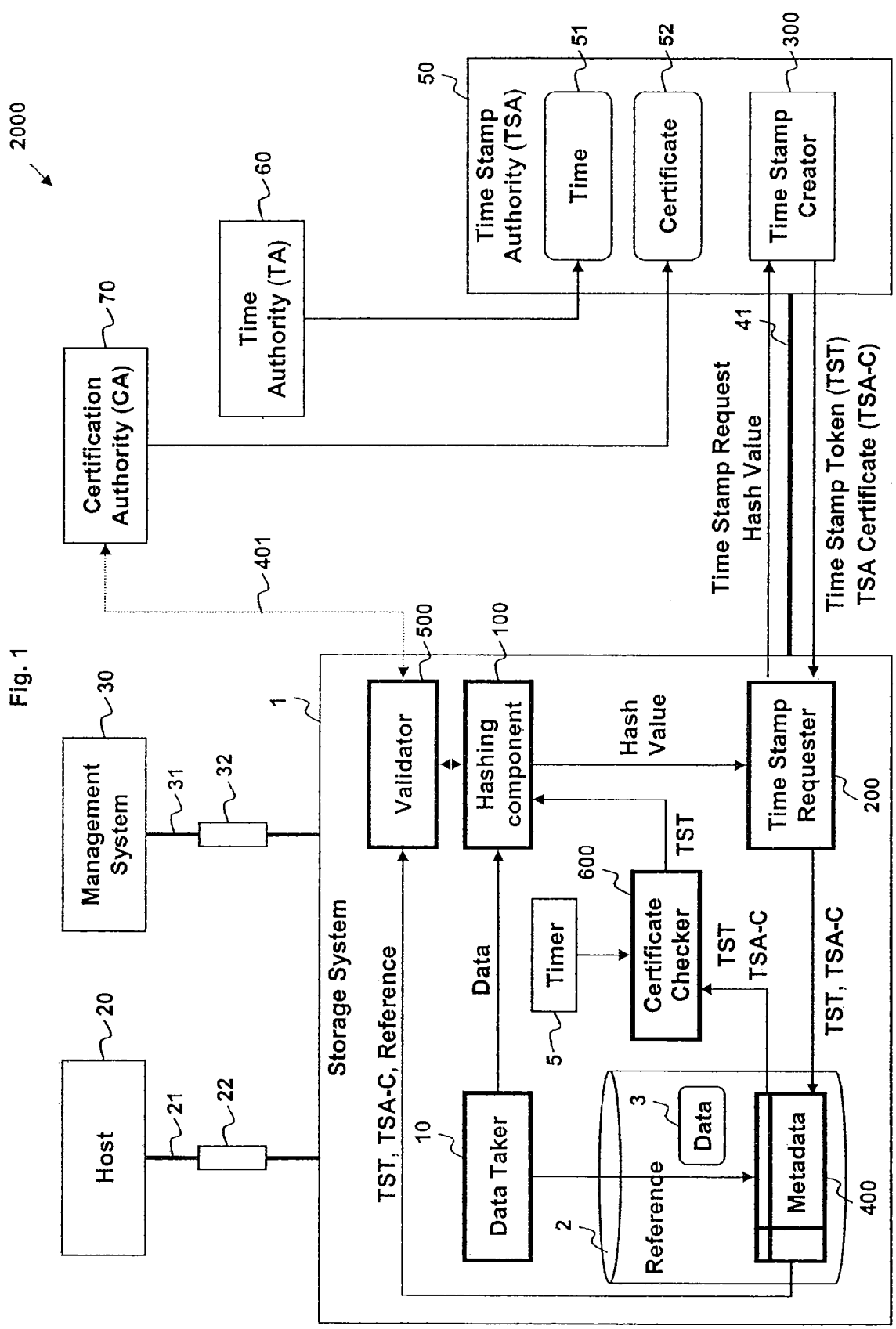
FIG. 1 shows an overall system including a storage system for providing trusted time stamping according to one embodiment of the present invention.

FIG. 1 shows a system 2000 including a storage system for providing trusted time stamping according to one embodiment of the present invention. System 2000 includes a storage system 1, a host 20, a management system 30, a time stamp authority (TSA) 50, a time authority (TA) 60, and a certification authority (CA) 70. System 2000 may also include other elements that are well known in the art. For example, storage system 1 may include controllers (not shown), other storage devices, cache memories connected by internal networks between each other, etc. Also, any number of each component in the system 2000 may be provided. For example, multiple storage systems 1 may be provided.

Devices 2 may be any storage devices configured to store data, such as RAID (redundant array of independent devices). Additionally, devices 2 include tape, compact disks (CDs) and digital versatile disks (DVDs), which may be configured as a library to keep metadata inside system 1.

Host 20 may be any computing system configured to send input/output (I/O) commands 22 to storage system 1. A person skilled in the art will recognize commands that may be sent from host 20 to storage system 1. For example, commands 22 include commands to write data, read data, delete data, backup data, etc.

I/O commands 22 may be sent through a network 21. Examples of network 21 include a storage area network (SAN) based on Fibre Channel, FICON and ESCON protocols; an IP network, such as a local area network (LAN) or a wide area network (WAN), that includes a network attached storage (NAS) based on network file system (NFS), common Internet file system (CIFS) and any other file server protocols; an IP SAN based on iSCSI; a direct connected network based on small computer system interface (SCSI), etc. Although only one host 20 is shown, it will be understood that any number of hosts 20 may be connected to storage system 1.

Management system 30 is configured to manage storage system 1 and to provide management capabilities to a user. An interface may be provided that allows a user to specify management commands to be performed. Examples of management commands include requesting that data be time stamped, requesting validation of time stamps, etc. Management commands 32 can be sent from management system 30 to storage system 1 through a network 31. Network 31 may include any networks, such as SAN, internet protocol (IP) networks, serial networks, proprietary networks, and the like.

Storage system 1 includes a data taker 10, hashing component 100, a time stamp requestor 200, a validator 500, a metadata table 400, and a certificate checker 600. In one embodiment, these elements may be implemented in microcode executed on a computing device or a processing unit. The microcode may be stored on a computer-readable medium.

Data taker 10 is configured to specify data that should be time stamped. The data could be any kinds of data. Examples are data in a block, data in a device, a file, an object, etc. Data taker 10 may specify data in response to a management command 32 from storage management system 30 or an I/O command 22 from host 20. Any data 3 stored in devices 2 may be time stamped. When data is specified to be time stamped, the specification may indicate a storage area in devices 2. For example, a contiguous physical or logical space may be specified. Sometimes this space is called as an Extent, which is managed in metadata. The data found in the space or the extent may be time stamped without moving or copying the data to another device or area. Or in case that the specified data is fragmented in several spaces, storage system 1 moves or copies data to a single contiguous space (i.e. a new extent). Because a time stamp is being requested for data stored in the storage system, storage system 1 includes modules that are able to provide trusted time stamping.

In one embodiment, data may have a characteristic of fixity in that the data cannot be modified or deleted. This is because a time stamp may be effective only as long as data is not deleted or modified. Examples of data include mirrored data or snapshot data at a specific point in time, WORM-protected data that host 20 cannot override or delete, etc.

Data taker 10 sends data to be time stamped to hashing component 100. Hashing component 100 is configured to hash the data received from data taker 10. Hashing component 100 hashes the data to generate a hash value. In one embodiment, any hashing algorithm may be used to generate the hash value, such as one-way functions, message digest functions, one-way message digest function, and trap door functions. Examples of the algorithm include MD5 (Message Digest 5) and SHA-1 (Secure Hash Algorithm 1). Also, keyed hash algorithm, such as Keyed MD5, may be used. In this case, system 1 may achieve higher data integrity because the hash cannot be calculated without the key. A person skilled in the art will recognize other methods that may be used to hash data to generate the hash value.

Time stamp requestor 200 receives the generated hash value from hashing component 100 and is configured to send a time stamp request and the hash value to TSA 50. The request may be sent over any network 41. For example, network 41 may be the Internet or a WAN.

TSA 50 is configured to provide time stamping services. In one embodiment, TSA 50 is implemented as a computer system that can provide time stamping services automatically. A person skilled in the art will recognize many forms of TSA 50. In one embodiment, TSA 50 receives a request for a time stamp and can provide a time stamp token (TST) and TSA certificate (TSA-C 52) to time stamp requestor 200.

TSA 50 receives an authorized time 51 from a time authority (TA) 60. TA 60 may be any entity that creates time information. For example, TA 60 may include entities such as a national time authority in a country, National Institute of Standards and Technology, Communications Research and Laboratory in Japan, etc. The time 51 received from TA 60 may be adjusted according to a network time protocol (NTP) to account for time that is taken to send the time through a network.

TSA 50 also obtains a time stamping authority certificate (TSA-C) 52 that provides additional certification. A certification authority (CA) 70 may provide TSA-C 52 to TSA 50. For example, CA 70 may provide a private key or a signature key for encryption or a digital signature and its public key for decryption. TSA 50 sends TSA-C 52 along with a time stamp to a requestor as a third party authorization. TSA-C 52 may have a valid period associated with it. For example, TSA-C 52 may expire after a certain amount of time. If this happens, the time stamp associated with TSA-C 52 may have to be authorized again by CA 70.

A time stamp creator 300 is configured to create a trusted time stamp token in response to a request from time stamp requestor 200. In one embodiment, time stamp creator 300 receives a time stamp request and a hash value. Time stamp creator 300 then obtains a time 51 and a TSA-C 52. A time stamp token is then created by time stamp creator 300 using time 51 and the hash value. In one embodiment, the time stamp token may be created by digitally signing the hash value and time 51 using a signature key certified by certificate 52. The time stamp token and TSA-C 52 may be then sent back to the requestor. It will be understood that a person skilled in the art will recognize other methods of creating a time stamp token.

It should be noted that CA 70, TA 60, and TSA 50 should be entities that can be trusted enough by users such that a time stamp token can be validated and trusted. Additionally, time 51 and certificate 52 should be such that they can also be trusted. Although CA 70, TA 60, and TSA 50 shown as separate entities, it will be understood that the functions of these entities may be performed by other entities or combined into one entity. Also, any number of CA 70, TA 60 and TSA 50 may be included in system 2000.

Time stamp requestor 200 receives the TST and TSA-C 52 and stores them in devices 2. The time 51 stored in the TST may be considered a time stamp. Time 51 indicates a time that the data that was time stamped was created and/or modified. TST and TSA-C 52 may be stored in a table 400 as metadata. Table 400 includes TST and TSA-C 52 with a reference to the data that was time stamped. As an example of the reference, an address to the data and a size of the data in which a time stamp was requested may be stored. An advantage of storing a reference to the data instead of storing the time stamp with the data associated with a time stamp is that the metadata may be used by host 20 or management system 30 to determine a reference to access the data normally. Thus, when a request for validating a time stamp is received, table 400 may be easily accessed to determine the reference to the data in addition to the TST and TSA-C 52. In another embodiment, the TST and TSA-C 52 may be stored with the data. For example, metadata may be attached to the data in which a time stamp was requested. In either case, the TST and TSA-C 52 may be stored in devices 2 that store the data.

FIG. 2 depicts an example of a metadata table 400 according to one embodiment of the present invention. A column 411 includes an identifier that is used to identify each entry in table 400. Each identifier is associated with a TST and TSA-C 52 received from TSA 50. For example, a column 412 includes data of TSTs, and column 413 includes data of TSA-C 52s. The data in table 400 may include strings, symbols, or any other parameters that may represent the TST and TSA-C 52.

In a column 414, a data reference is stored that references the data in which a time stamp was requested. A reference may include an address to data and a size of data, and take various forms, such as a logical device number, block numbers in a logical device, a file name, etc.

As shown in a row 421, data whose reference in storage system 1 is "CCC" is time stamped by a TST "AAA" and certified by a TSA-C 52 "BBB". Additionally, in a row 422, data found at the reference "ZZZ" in storage system 1 is time stamped by a TST "XXX" and certified by a TSA-C 52 "YYY". As shown, the TST and TSA-C 52 are not integrated with the data that was time stamped but associated with a reference to the data. In another embodiment, the TST and TSA-C 52 may be stored with the data found at the references "CCC" and "ZZZ".

In one embodiment because, TST and TSA-C 52 are stored in a device that is protected by a RAID architecture, instead of being stored in an ordinal device that is not protected, reliable and trusted time stamping capability is provided for RAID devices. Also, it is convenient to manage the metadata as well as data itself under the same RAID architecture.

At some point, validation of a time stamp may be requested. Validator 500 is configured to validate a time stamp associated with the data. When a time stamp validation request for a specific data is received, a TST, a TSA-C 52, as well as data are accessed. In one embodiment, the TST and TSA-C 52 are accessed through ID 411 or reference 414 in table 400. In another embodiment, the TST and TSA-C 52 are attached to the data and thus are accessed when the data is accessed.

The TST may be first validated. In one embodiment, validator 500 may communicate through a network 401, such as the Internet, with certification authority 70. It may validate TSA 50 and the TST using the TSA-C 52. For example, validator 500 sends the TSA-C 52 to CA 70 to verify TSA-C 52 and receives a public key from CA 70 that corresponds to the TSA-C 52. The key is then used to open or decrypt the TST (e.g., the digital signature of the TST is decrypted). If the TST can be opened or decrypted, the time stamp found within the TST is authorized by CA 70. Because CA 70 is a party separate from storage system 1 and nobody except TSA 50 can modify the content of the TST, i.e. the time stamp, the time stamp can be trusted. An advantage of using a third party, such as CA 70, to validate the time stamp is the public may be able to trust the time stamp that was generated. Also, the third party may be a public or government authority for credibility.

If the TST is authorized by CA 70, the data that was time stamped is then validated and it can be determined that the data is as it was when it was time stamped. In validating the data, the reference is used to access data associated with the TST. The accessed data is hashed to generate a second hash value. The second hash value is then compared with the hash value included within the TST. Based on the comparison, validator 500 determines whether or not to validate the data. For example, if the second hash value corresponds to the hash value found in the TST, validator 500 validates the time stamp. By comparing the hash values, validator 500 validates that data associated with the TST has not been modified or changed since the time stamp was generated. If the values are different, validator 500 does not validate the time stamp.

If the TST and data are validated, then the time stamp may be validated. Thus, the time stamp can be validated in addition to the data that was time stamped.

In addition to performing the above validation, a certificate checker 600 may check TSA-C 52 periodically to determine if the TSA-C 52 has expired. For example, an internal timer 5 may be used to check an expiration time included on TSA-C 52 to determine if the expiration has passed. If a TSA-C 52 has expired, certificate checker 600 may send the TST to hashing component 100 in order to have the TST go through the trusted time stamping process again. In this case, a new TSA-C 52 may be generated for the TST. This process will be described in more detail below.

Figure 3:
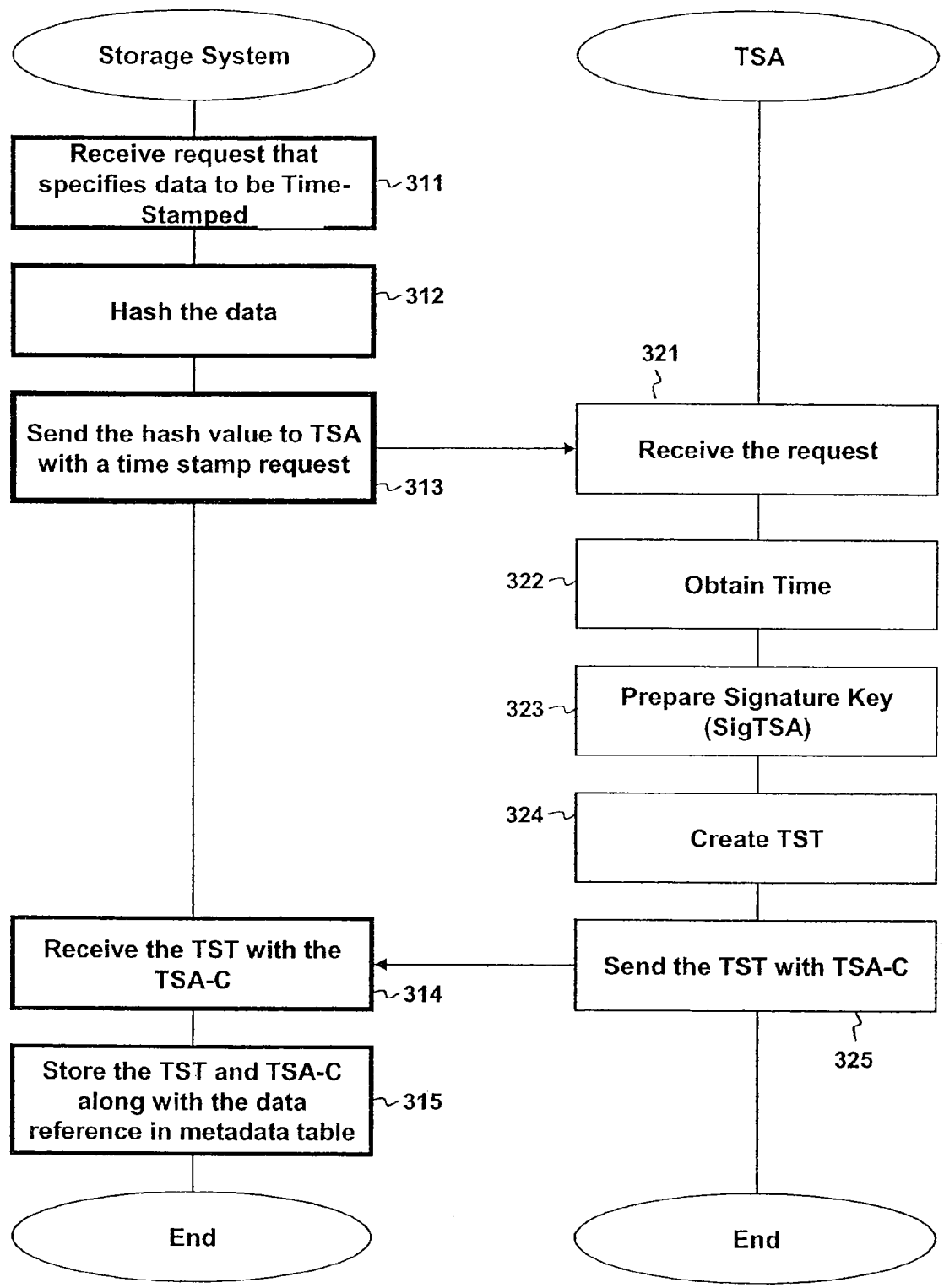
FIG. 3 depicts a simplified flowchart of a method for providing trusted time stamping according to one embodiment of the present invention.

FIG. 3 depicts a simplified flowchart 310 of a method for providing trusted time stamping according to one embodiment of the present invention. In step 311, a request from host 20 or management system 30 that specifies data to be time stamped is received. Data taker 10 accesses the data to be time stamped. In one embodiment, the data has the characteristic of fixity.

In step 312, hashing component 100 hashes the data. Examples of hashing algorithms that may be used include secure hash algorithm 1 (SHA-1), message digest 5 (MD 5), and the like.

In step 313, storage system 1 sends the generated hash value along with a time stamping request to TSA 50. The communication protocol used between storage system 1 and TSA 50 may be implemented based on a standard, such as found in RFC 3161. In step 321, TSA 50 receives the request.

In step 322, a time 51 is obtained by TSA 50. Time 51 may be obtained by communicating with TA 60 to request a time. Also, a time that is sent periodically by TA 60 may be used.

In step 323, TSA 50 prepares a signature key or private key to execute a digital signature. In one embodiment, the signature key is unique to TSA 50 and authorized by a third party, such as CA 70. Methods of using a digital signature are well known and may use public key infrastructure (PKI) techniques. In this embodiment, SigTSA indicates a signature key of TSA to be used. Asymmetric key cryptosystems or encryption methods, such as RSA (Rivest Shamir Adleman), DSA (Digital Signature Algorithm), ECDSA (Elliptic Curve Digital Signature Algorithm), and the like may also be used. These encryption methods may also be used together with hash methods within a digital signature algorithm. Examples of these techniques include SHA-1 hashing with RSA encryption, MD 5 hashing with RSA encryption, SHA-1 hashing with DSA encryption, SHA-1 hashing using ECDSA encryption, and the like. In preparing the signature key, TSA 50 receives a certificate (TSA-C 52) from CA 70 that authorizes a signature key.

In step 324, a TST is created that includes a hash value and the time obtained in step 322. In one embodiment, the digital signature is used to sign the hash value and the time. For example, the hash value and the time may be encrypted using a private key associated with the digital signature. The result of the encryption may be referred to as the TST. Because the TST is encrypted with a private key, it may not be decrypted without its public key, which is authorized by CA 70. In other words, the time in the TST may not be modifiable by anybody.

In step 325, the TST and TSA-C 52 are sent to storage system 1. Storage system 1 receives the TST and TSA-C 52 in step 314. The communication between TSA 50 and storage system 1 may be implemented using a protocol that is standardized, such as in RFC 3161. In one embodiment, the TSA-C 52 is embedded in the TST but does not need to be.

In step 315, storage system 1 stores the TST and the TSA-C 52 along with a reference to the data being time stamped in table 400. In one embodiment, the TST, TSA-C 52, and reference are stored in metadata table 400. The TST, TSA-C 52, and reference may be stored in storage device 2 and are protected by a RAID architecture, which ensures data reliability and availability.

Figure 4:
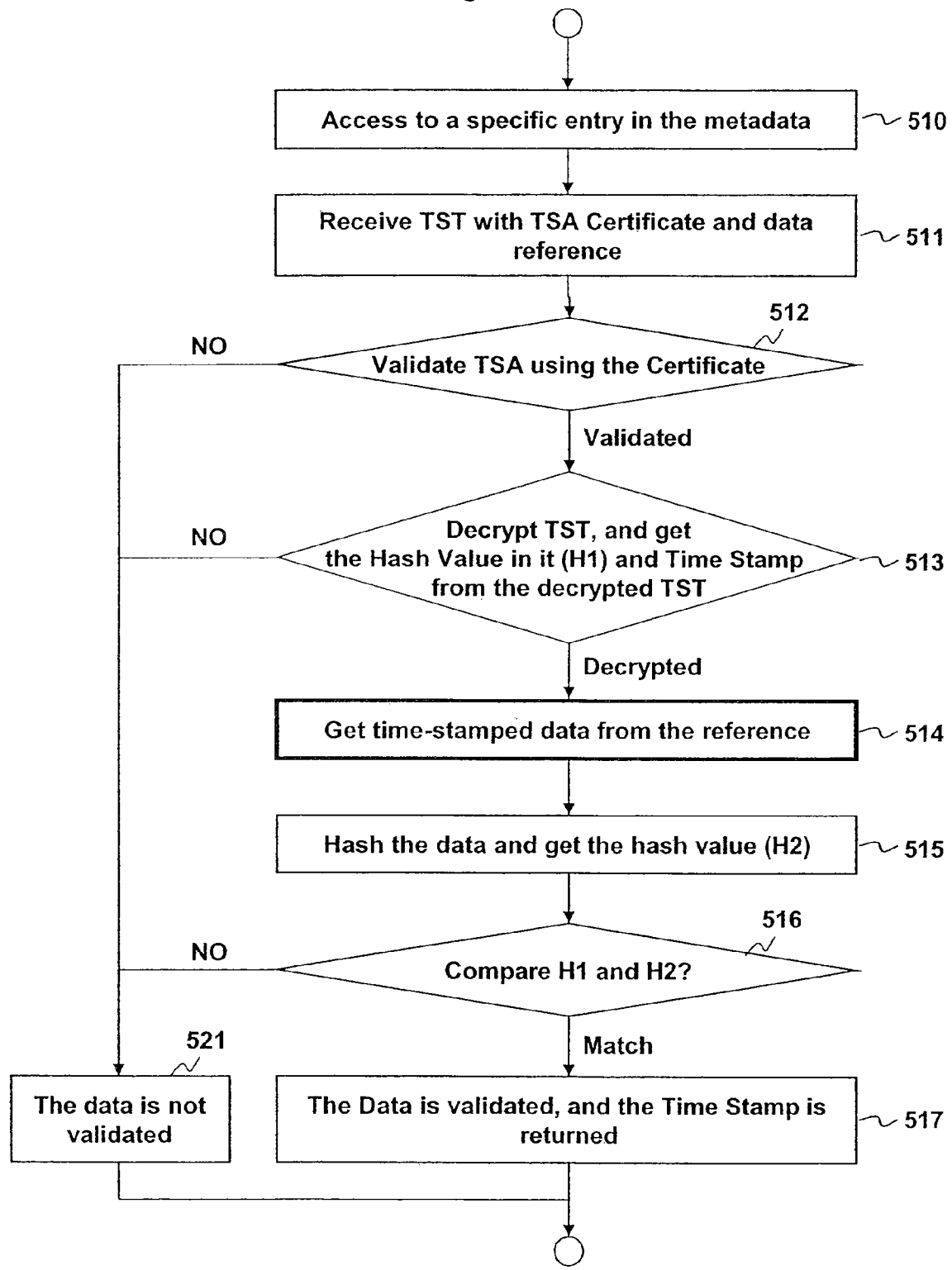
FIG. 4 depicts a simplified flowchart of a method for validating a time stamp according to one embodiment of the present invention.

FIG. 4 depicts a simplified flowchart 509 of a method for validating a time stamp according to one embodiment of the present invention. A validation request may be received from a user using management system 30 through a management command 32. In one embodiment, management system 30 may provide a user interface that displays a list of time stamped data. All information that describes attributes of the data may also be displayed. For example, a name, a brief description, etc., may be included with the data displayed. A user may then select an entry in order to have its time stamp validated.

In step 510, validator 500 receives a time stamp validation request and accesses a specific entry in table 400. The entry may have been specified by a management command 32 from management system 30. In another embodiment, the entry may be derived from the request indicating an ID 411 in table 400.

In step 511, the TST, TSA-C 52, and the data reference are received for the specified entry. In one embodiment, the information is retrieved from devices 2. In another embodiment, if the TST and TSA-C 52 are attached to the data, the data may be accessed along with the TST and TSA-C 52 using a reference to the data. The reference may be determined using metadata stored in table 400 or be specified by management command 32.

In step 512, validator 500 validates the information. For example, validator 500 may validate TSA 50 and the TST using the TSA-C 52. Validator 500 communicates with CA 70 to certify TSA-C 52 and as a result validates TSA 50. For example, TSA-C 52 may be sent to CA 70, compared with an original certificate of TSA 50 generated in CA 70, and certified. In another embodiment, an original certificate to TSA 50 may be received from CA 70, compared with the TSA-C 52, and certified. In one embodiment, validator 500 communicates with CA 70 to receive a public key associated with TSA 50. The public key is then used to decrypt or open the TST that was encrypted by the private key of TSA 50. Because CA 70 is a third party that is configured to authorize TSA 50, the public key itself may be trusted.

If TSA 50 is validated, then the process proceeds to step 513. Otherwise, component 500 determines that the data is not valid and exits the process (step 521).

In step 513, Validator 500 decrypts the TST using the received public key. If the TST was properly encrypted by TSA 50, the TST is decrypted and the hash value of the data when it was time stamped and the time 51 itself may be determined. If the TST cannot be decrypted, it is determined that the data is not validated in step 521. The hash value that is extracted from the decrypted TST is specified as "H1".

In step 514, validator 500 accesses the data specified by the reference. This is the data that was supposed to be time stamped. In one embodiment, the data itself is accessed and is not integrated with TST.

In step 515, the accessed data is hashed to generate a hash value "H2".

In step 516, validator 500 compares values for H1 and H2. If H1 and H2 match, then validator 500 determines that the data is validated and returns a decrypted time stamp from the TST to management system 30 in step 517. If H1 and H2 do not match, then it is determined that the data and thus the time stamp is not validated in step 521.

Accordingly, validator 500 validates the TST using the TSA-C 52 and in addition to validating the data. Accordingly, a two-tier validation is provided by storage system 1. Not only is TSA 50 that provided the time stamp validated, the data is also validated. Accordingly, the time stamp itself can be trusted. Also, it can be trusted that the data has not been modified since the time stamp was created.

Figure 5:
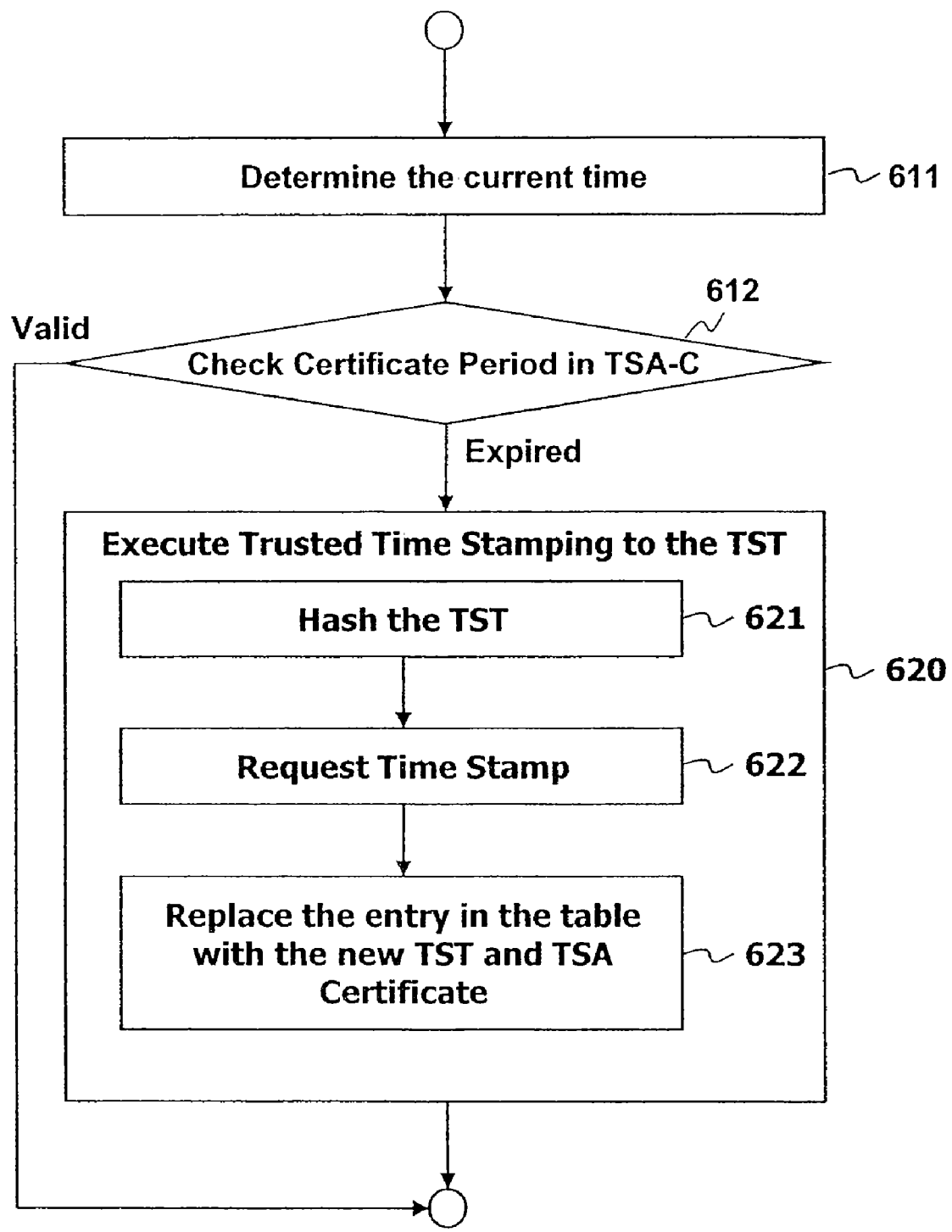
FIG. 5 depicts a simplified flowchart of a process for validating a time stamping authority certificate (TSA-C) according to one embodiment of the present invention.

FIG. 5 depicts a simplified flowchart 610 of a process for validating a TSA-C 52 according to one embodiment of the present invention. In one embodiment, the TSA-C 52 is associated with a period of time in which the TSA-C 52 may be considered valid. The period may vary depending on how strong the public key is assumed to be For example, if the public key is susceptible to attacks, the period may be short. If a certificate period has expired, then the TSA-C 52 itself is not effective to authorize TSA 50 and thus is ineffective. For example, a certificate period for a TSA-C 52 for a 1024-bit RSA public key is usually set to 5 years and a 2048-bit public key is set to 10 years.

In step 611, certificate checker 600 determines the current time. For example, a timer 5 internal to storage system 1 may be used. Also, an external timer may be used. For example, in order to determine an exact timing, timer 5 may communicate with TA 60 and obtain an authorized time periodically.

In step 612, certificate checker 600 checks the certificate period in the TSA-C 52. In one embodiment, the TSA-C 52 includes the starting date and time of the certification and the certificate period. The current date and time may be subtracted from the starting date and time to determine an elapsed time. If the elapsed time is longer than the certificate period, then it is determined that the period has expired. If the period has not expired, it is determined that the TSA-C 52 is valid and this process is ended.

If the TSA-C 52 has expired, in step 620, trusted time stamping is performed with the TST itself.

Figure 6:
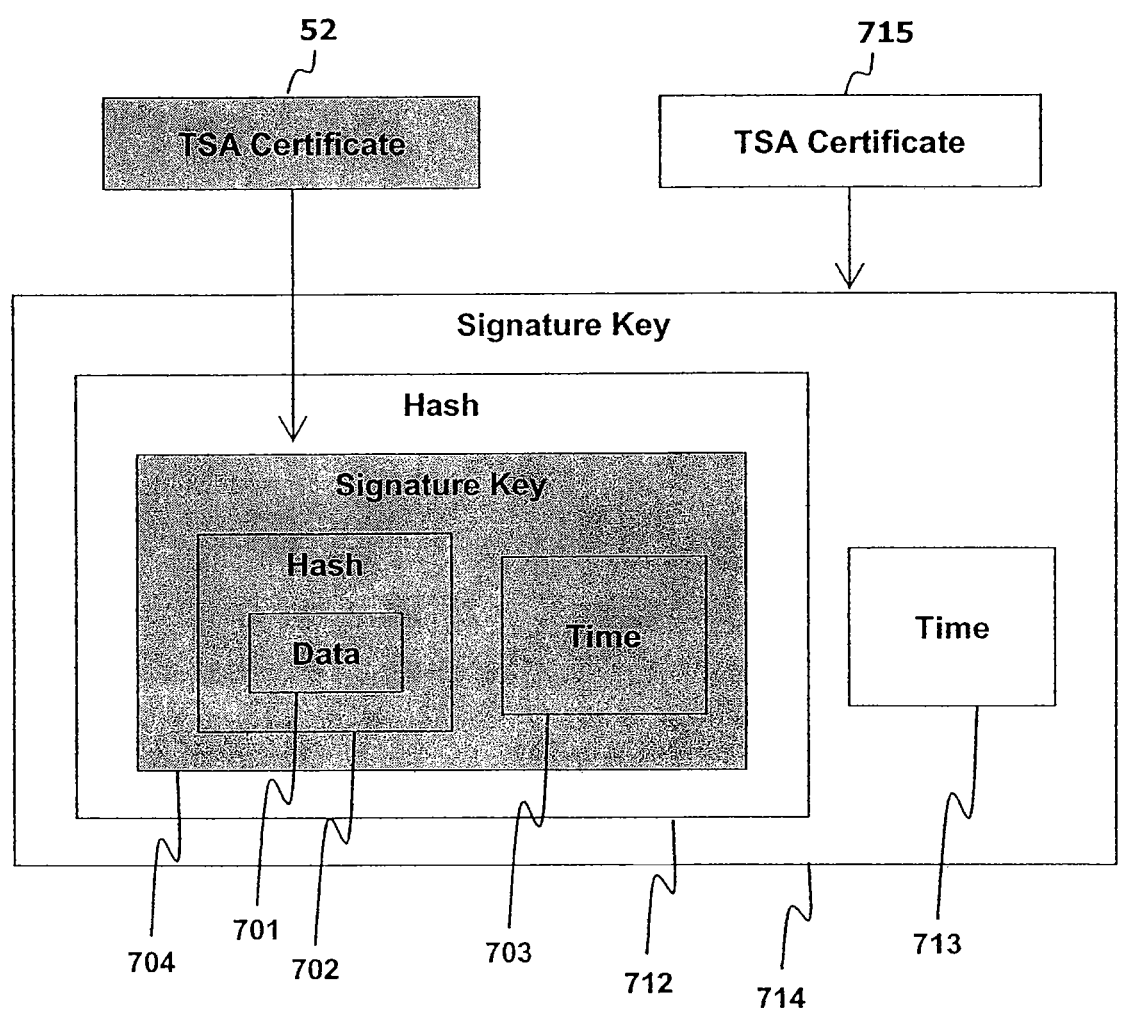
FIG. 6 depicts an example of a time stamp token (TST) in which trusted time stamping has been applied to an expired TST according to one embodiment of the present invention.

FIG. 6 depicts an example of a TST in which trusted time stamping has been applied according to one embodiment of the present invention. A TST 704 includes a hash value 702 of data 701. Additionally, a time stamp 703 is also included in TST 704. Also, TST 704 is associated with a TSA-C 52. In this case, TSA-C 52 has expired.

Because TSA-C 52 has expired, the trusted time stamping process is performed with TST 704. A hash of TST 704 is taken to generate a hash value 712 of the TST 704. Additionally, a new time 713 is received from TA 60. The hash value 712 and time 713 may be encrypted using a signature key in order to generate a TST 714. This process may be similar to the process described above with respect to generating the first TST.

TST 714 is then certified using a new TSA-C 715. Accordingly, the TST 704 and expired TSA-C 52 have been re-certified with an additional time 713 using a new unexpired TSA-C 52. Additionally, the new TST 714 includes a hash 712 of the original TST 704.

Referring back to FIG. 5, a method of generating a new TSA-C 52 and TST 714 is described. In step 621, TST 704 is hashed. This process may be similar to the process described in step 312 of FIG. 3.

In step 622, a time stamp is requested by time stamp requestor 200. TSA 50 then generates a trusted time stamp. This process is similar to the steps 313, 321, 322, 323, 324, 325, and 314 described in FIG. 3.

In step 623, the entry in table 400 is replaced with the new TST 714 and new TSA-C 52. This means that the TST 714 and TSA-C 52 are stored with the reference to the original data in table 400. In another embodiment, TST 714 and TSA-C 52 may be stored with the data being time stamped.

It should be noted that the above process described in FIG. 4 may be performed any number of times depending on how many times a TSA-C 52 expires. The number of re-certifications may be stored with the new TST and TSA-C 52, as validator 500 may use the number to determine how many times the TST needs to be validated and decrypted to determine the original time stamp. In FIG. 4, the number may be determined, and the steps 511-516 are executed based on the number of times. When a validation request for the entry is received, the process described above in FIG. 4 for validating the TST may be implemented. However, the process may be performed twice in order to determine data 701 and time 703.

Figure 7:
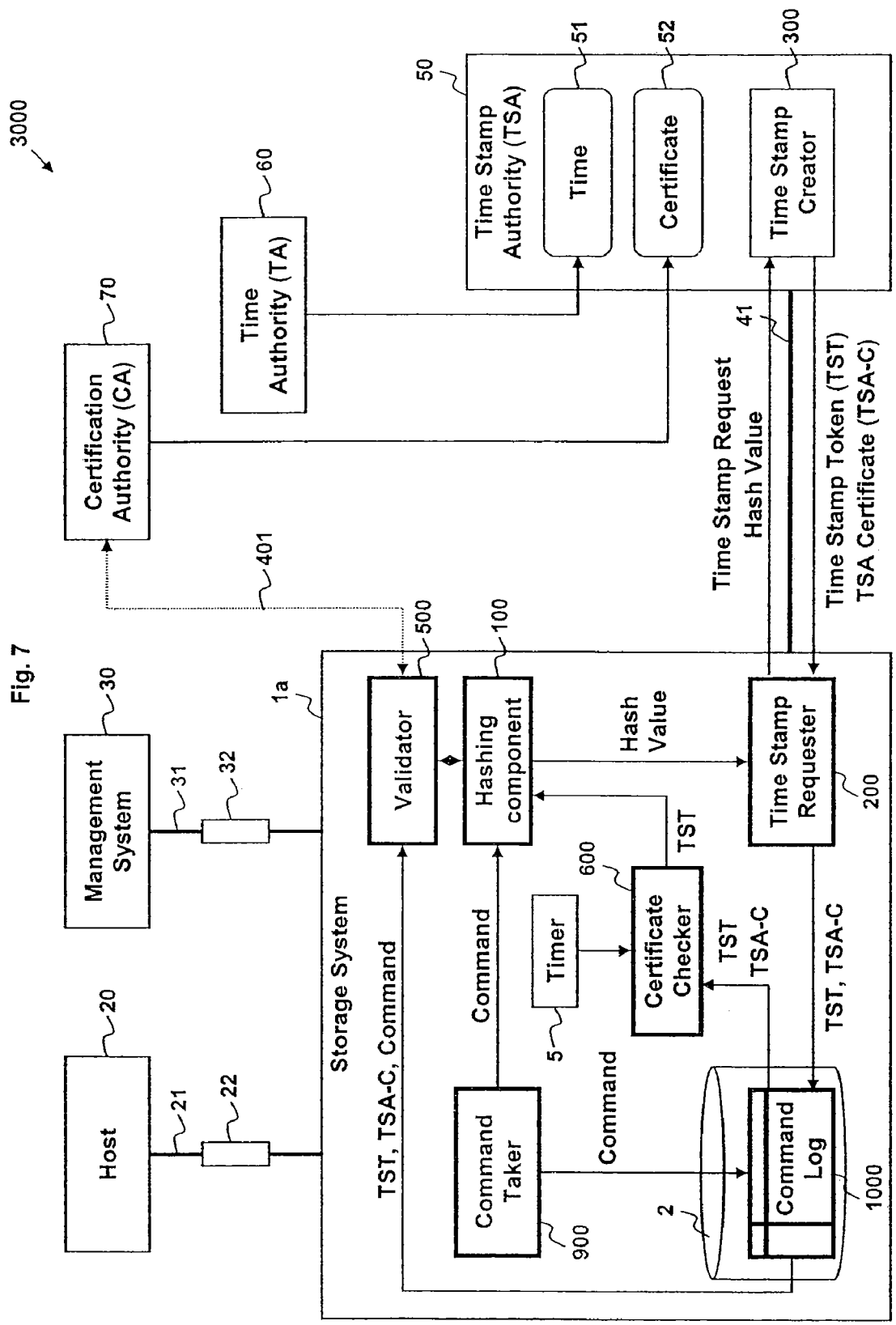
FIG. 7 depicts an overall system including a data storage system for providing trusted time stamping according to one embodiment of the present invention.

FIG. 7 depicts a system 3000 including a storage system for providing trusted time stamping according to one embodiment of the present invention. In one embodiment, system 3000 provides time stamping for specific input/output commands. For example, time stamps may be generated for input/output commands 22 received from host 20. The time stamp may be used to approve or authorize that a specific I/O command was executed at a specific time.

Figure 8:
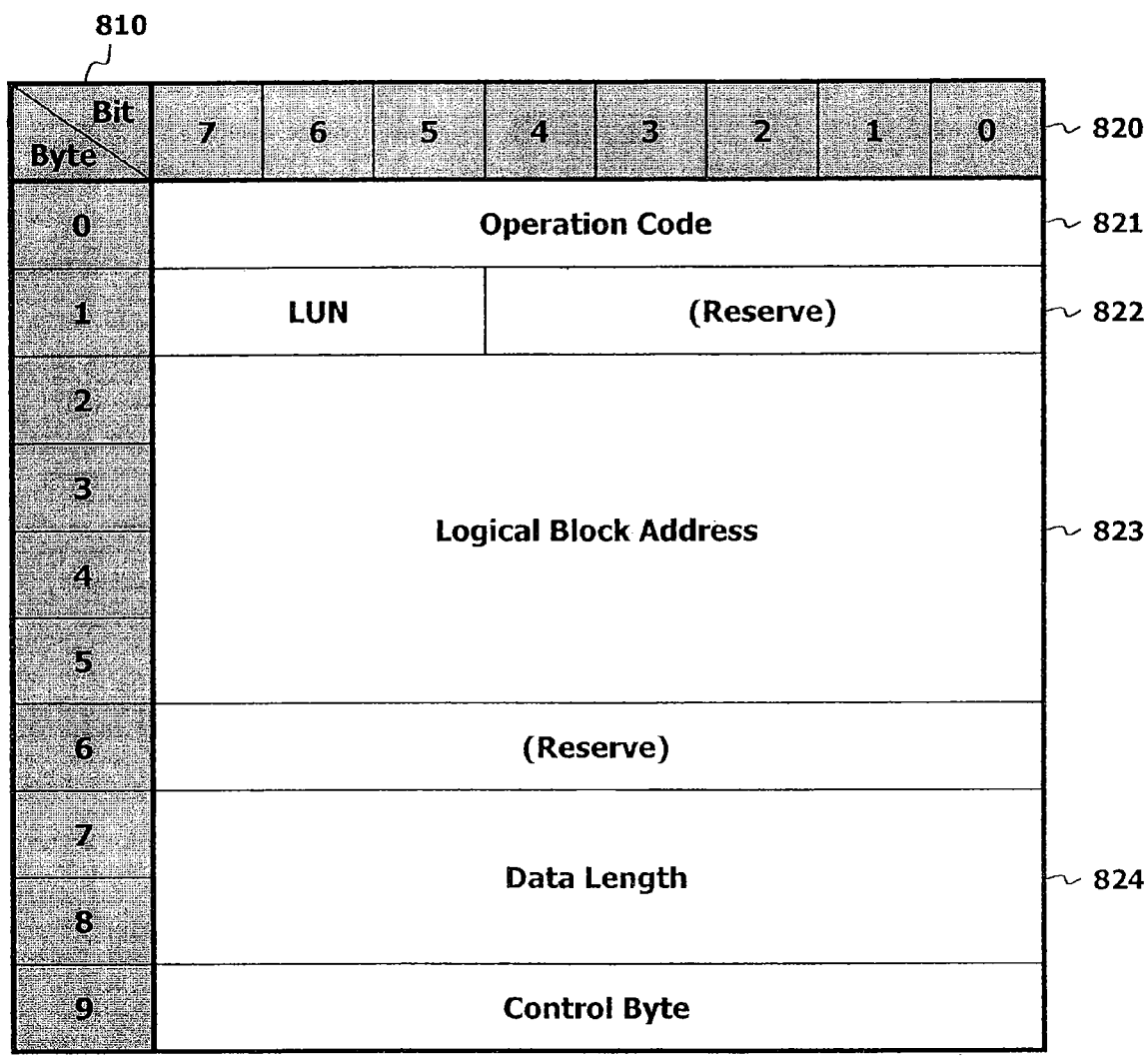
FIG. 8 depicts a ten byte SCSI command description that may be referred to as a command descriptor block (CDB)

The components depicted in FIG. 7 may perform the similar functions as described with respect to FIGS. 1-6. However, in this case, I/O commands 22 are processed to provide trusted time stamping. Command taker 900 may perform similar functions as data taker 10 but is configured to receive a command to be time stamped and to send it to hashing component 100. For example, command taker 900 may receive a command, such as a SCSI command or any other I/O commands 22. FIG. 8 depicts an example of an I/O command 22.

As shown, FIG. 8 depicts a ten byte SCSI command description that may be referred to as a command descriptor block (CDB). Although a CDB is shown, it is understood that the command processed may include any kind of data. A column 810 indicates a byte order in the block and a row 820 indicates a bit order in each byte. Operation code 821 contains a code that indicates a particular command. A logical number (LUN) 822 indicates a logical volume (device) in storage system 1. It will be appreciated that there are other ways to indicate a logical volume in a SCSI interface. A logical block address 823 indicates a block in the logical volume where the command is supposed to access. A data length 824 indicates a length of data that the commands should process. It will be understood that input/output command 22 may also take other forms.

Referring back to FIG. 7, command taker 900 may be configured to filter particular CDBs using rules to determine which CDBs should be time stamped. For example, rules may be used to determine that I/O commands 22 that prove when a storage device starts to be used, "format"-related I/O commands 22, I/O commands 22 for specific logical volumes, etc. should be time stamped. Logical volumes should be time stamped because some logical volumes are highly protected areas where I/O commands 22 that affect the highly protected areas should have a time stamp indicating the time that they were executed. In addition, other storage areas may be determined in which I/O commands 22 that affect those areas should be time stamped. Also, command taker 900 may be configured to time stamp all I/O commands 22. However, this may not be cost-effective and may impact the performance of storage system 1. But, the data in storage system 1 may be better trusted if all I/O commands 22 are time stamped in a trusted way.

Figure 9:
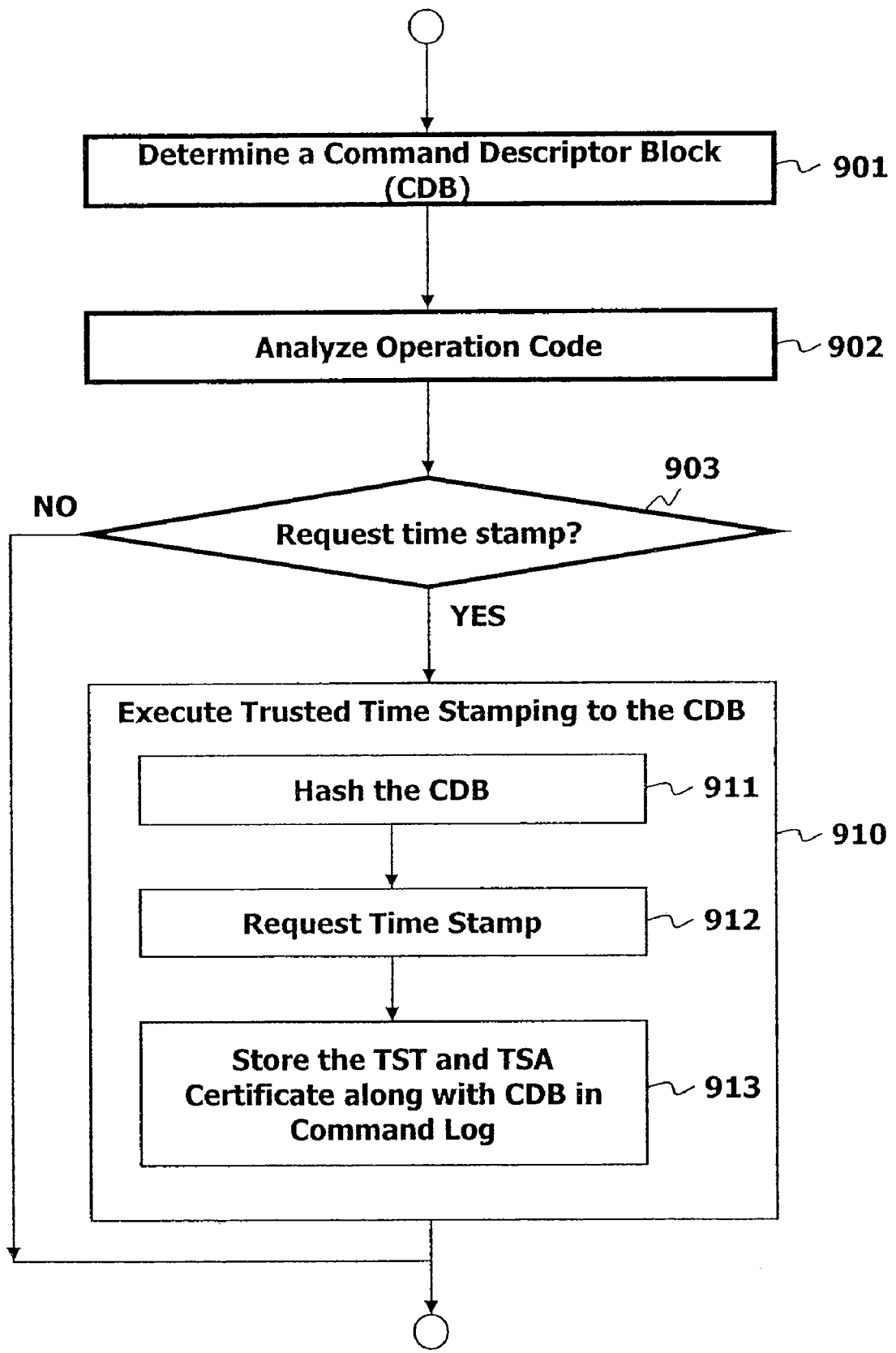
FIG. 9 depicts a method for providing trusted time stamping to I/O commands according to one embodiment of the present invention.

FIG. 9 depicts a method 900 for providing trusted time stamping to I/O commands 22 according to one embodiment of the present invention. In step 901, command taker 900 determines a CDB in an I/O command 22. In one embodiment, command taker 900 may determine all CDBs for all I/O commands 22. In one embodiment, a CDB is extracted for all I/O commands 22.

In step 902, command taker 900 extracts an operation code 821 and analyzes it. Operation code 821 indicates what kind of operation I/O command 22 is performing. In analyzing operation code 821, command taker 900 may determine whether or not a time stamp for the I/O command 22 should be requested.

In step 903, command taker 900 determines from code 821 if a time stamp should be requested for I/O command 22. In one embodiment, command taker 900 determines a time stamp should be requested if operation code 821 matches any predefined codes that indicate a time stamp should be requested. Otherwise, the process is exited and a time stamp is not requested.

In step 910, trusted time stamping is executed for the CDB. The process is similar to that described in FIG. 3. For example, in step 911, hashing component 100 hashes the CDB to generate a hash value. This is similar to the process described in step 312 of FIG. 3.

In step 912, time stamp requester 200 sends a time stamp request to TSA 50 along with the generated hash value. The TST and TSA-C 52 are then generated. This process is similar to the process described in steps 313, 314, 321, 322, 323, 324, and 325 of FIG. 3.

In step 913, a TST and TSA-C 52 received from TSA 50 are stored in a table 1000. In one embodiment, table 1000 may be a command log. The command log shows I/O commands 22 that have been performed. In one embodiment, the TST and TSA-C 52 are stored with the CDB itself in table 1000. This is unique because a trusted time stamp and its certification are stored with an I/O command in a command log.

FIG. 10 depicts an example of a table 1000 generated for an I/O command according to one embodiment of the present invention. In one embodiment, command log table is configured to store information for command executed by system 1. A column 1011 shows an identifier for an entry. For example, each time an I/O command 22 should be time stamped, an entry in table 1000 is created for that I/O command 22. A column 1012 stores data of a TST. Additionally, a column 1013 stores data of a TSA-C 52. These columns store similar information as described with respect to columns 412 and 413 of FIG. 2. In a column 1014, the CDB is stored for the associated TST and TSA-C 52.

The TST and TSA-C 52 may be validated using the process described above. For example, the validation process may be similar to the process described in FIG. 4 except the steps 510, 511 and 514. Instead of steps 510 and 511, validator 500 accesses a specific entry in the command log table 1000, and determines TST, TST-C and the CDB. The accessed CDB may be hashed and compared with a hash value found in the TST. Because the CDB is accessed from table 1000, step 514 may not be necessary because a reference to the CDB is not obtained. However, it should be understood that a reference to a stored CDB may be found in table 1000 and used to access a CDB.

There are many advantages for storing a TST and TSA-C 52 with a CDB. For example, it can be verified when I/O commands 22 were executed. The process may be used when verification of a command is requested. For example, users may submit the time stamp information to a regulator to prove when I/O commands 22 were executed.

In another embodiment, trusted time stamping for specific storage management commands 32 may also be provided. For example, storage management commands 32 may be processed similarly as described with respect to I/O commands 22. It is determined that a time stamp should be requested for a specific storage management command 32. A time stamp is requested in a similar manner as described above. Also, information associated with the storage management command 32 is hashed and sent with the request. A time stamp token and TSA-C 52 are received and stored in table 1000. Information for the storage management command 32 is then stored in table 1000. For example, the storage management command 32 itself and its parameters may be stored instead of the CDB.

Also, because time stamped data itself is still stored in the storage device that originally stores the data, the storage system itself requires apparatus and methods for data hashing, time stamp requesting, and saving certified time stamps within the system. Also, the storage system requires apparatus and methods for certifying and validating the time stamps. In other words, with 3rd party certification, the storage system itself can time-stamp an arbitrary data area without moving or copying data to other devices. Therefore, the system can help an auditor validate the data integrity with time stamp.

The present invention can be implemented in the form of control logic in software or hardware or a combination of both. The control logic may be stored on an information storage medium (e.g., computer readable medium) in a plurality of instructions adapted to direct an information processing device to perform a set of steps. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for providing trusted time stamping for commands for a data storage system, the method comprising:
    determining a command executed in the data storage system;
    hashing information for the command to generate a hash value;
    sending the hash value and a request for a time stamp to a time stamping authority;
    receiving a time stamp token and a time stamping authority certificate from the time stamping authority, the time stamp token comprising a time stamp and the hash value, the time stamp and hash value providing trusted time stamping mechanism for the command;
    storing the time stamp token command and the command in a command log in the data storage system; and
    validating the time stamp token stored in the data storage system, including:
        accessing the information for the command;
        hashing the accessed information to generate a second hash value;
        retrieving the hash value of the time stamp token by utilizing information associated with the time stamping authority certificate;
        comparing the second hash value to the hash value found in the time stamp token which is stored in the data storage system; and
        validating the time stamp token based on the comparison;
    wherein determining a command includes determining whether the command should be time stamped based on a predetermined rule; and
    wherein the predetermined rule is to which logical volume of the data storage system the command is directed.

2. The method of claim 1, wherein storing the time stamp token comprises storing the time stamp token in a device that is storing the information for the command.

3. The method of claim 2, wherein the device comprises a redundant array of independent disks (RAID).

4. The method of claim 1, wherein the command log includes the information for the command.

5. The method of claim 1, wherein the step of validating further comprises
    contacting a party that can provide information needed to validate the time stamping authority certificate.

6. The method of claim 1, wherein validating the time stamp token based on the comparison comprises affirmatively validating the time stamp token if the second hash value matches the hash value found in the time stamp token.

7. The method of claim 1, wherein the time stamp token is encrypted using a private key of the time stamping authority.

8. The method of claim 7, further comprising:
    validating the time stamp token, wherein validating comprises decrypting the time stamp token using a public key of the time stamping authority.

9. The method of claim 8, wherein the public key is received from a certification authority.

10. The method of claim 1, wherein hashing the data comprises hashing the data using a keyed hashing method.

11. The method of claim 1, further comprising checking if the time stamping authority certificate is valid.

12. The method of claim 11, wherein the checking comprises
    determining a time using an internal timer of the data storage system; and
    using the time to determine if the time stamping authority certificate has expired.

13. The method of claim 1, wherein the information being hashed is fixed.

14. The method of claim 1, wherein the command comprises at least one of an I/O command for the data storage system and a management command for the data storage system.

15. A storage system for providing trusted time stamping for commands being executed in the storage system, the storage system comprising
    a processor and a memory which has modules to be executed by the processor, the modules including:
    a command determiner configured to determine a command being executed in the storage system;
    a hasher configured to hash information for the command to generate a hash value;
    a time stamp requester configured to send the hash value and a request for a time stamp to a time stamping authority;
    a receiver configured to receive a time stamp token and a time stamping authority certificate from the time stamping authority, the time stamp token comprising a time stamp and the hash value, the time stamp token providing trusted time stamping for the command, wherein the storage system is configured to store the time stamp token and the command in a command log in the data storage system; and
    a validator configured to validate the time stamp token stored in the data storage system, including:
        accessing the information for the command;
        hashing the accessed information to generate a second hash value;
        retrieving the hash value of the time stamp token by utilizing information associated with the time stamping authority certificate,
        comparing the second hash value to the hash value found in the time stamp token which is stored in the data storage system; and
        validating the time stamp token based on the comparison;
    wherein the command determiner is configured to determine whether the command should be time stamped based on a predetermined rule; and
    wherein the predetermined rule is to which logical volume of the data storage system the command is directed.

16. The system of claim 15, wherein the command log stores the time stamp token and hashed information for the command.

17. The system of claim 15, wherein the validator is further configured to contact a party that can provide information needed to validate the time stamp certificate.

18. The system of claim 15, wherein the validator is configured to affirmatively validate the time stamp token if the second hash value matches the hash value found in the time stamp token.

19. The system of claim 15, wherein the time stamp token is encrypted using a private key of the time stamping authority.

20. The system of claim 19, wherein the validator is further configured to decrypt the time stamp token using a public key of the time stamping authority.

21. The system of claim 20, wherein the public key is received from a certification authority.

22. The system of claim 15, wherein the hasher is configured to hash the data using a keyed hashing method.

23. The system of claim 15, further comprising a certificate checker configured to check if the time stamping authority certificate is valid.

24. The system of claim 15, wherein the certificate checker is configured to:
    determine a time using an internal timer of the data storage system; and
    use the time to determine if the time stamping authority certificate has expired.

25. The system of claim 15, wherein the hashed information for the command is fixed.

26. The system of claim 15, wherein the information for the command comprises at least one of an I/O command for the data storage system and a management command for the data storage system.

27. A method for validating a time stamp generated for a command being executed in a data storage system, the method comprising:
    receiving a request to validate a time stamp token received from a time stamping authority;
    receiving a time stamping authority certificate from the time stamping authority;
    accessing the time stamp token being stored in a command log in the data storage system;
    validating the time stamp token;
    determining a hash value included with the time stamp token by utilizing information associated with the time stamping authority certificate;
    accessing the command being stored in the command log in the data storage system that was time stamped using the time stamp token;
    hashing the information for the command to generate a second hash value;
    comparing the hash value included in the time stamp token with the second hash value;
    validating the information for the command based on the comparison; and
    if the time stamp token and the data are validated, validating the time stamp;
    wherein, before the time stamp is generated for the command, a predetermined rule is used to determine whether the command should be time stamped; and
    wherein the predetermined rule is to which logical volume of the data storage system the command is directed.

28. The method of claim 27, wherein accessing the command comprises accessing the command in a command log metadata table in the command log in the data storage system.

29. The method of claim 27, wherein accessing the time stamp token comprises accessing the time stamp token being stored in a command log metadata table in the command log with information for the command that was time stamped.

30. The method of claim 27, further comprising:
    receiving a time stamp certificate from the time stamping authority;
    wherein validating the time stamp token comprises contacting a party that can provide information needed to validate the time stamp certificate.

31. The method of claim 27, wherein validating the time stamp token based on the comparison comprises affirmatively validating the time stamp token if the second hash value matches the hash value found in the time stamp token.

32. The method of claim 27, further comprising receiving a time stamp certificate from the time stamping authority.

33. The method of claim 32, further comprising checking if the time stamp certificate is valid.

34. The method of claim 32, wherein checking comprising:
    determining a time using an internal timer of the data storage system; and
    using the time to determine if the time stamp certificate has expired.

35. The method of claim 27, wherein the time stamp token is encrypted using a private key of the time stamping authority.

36. The method of claim 35, further comprising:
    validating the time stamp token, wherein validating comprises decrypting the time stamp token using a public key of the time stamping authority.

37. The method of claim 36, wherein the public key is received from a certification authority.

38. The method of claim 27, wherein hashing the data comprises hashing the data using a keyed hashing method.

39. The method of claim 27, wherein the accessed data comprises at least one of data being stored in the data storage system, an I/O command for the data storage system, and a management command for the data storage system.

40. The method of claim 1, wherein the predetermined rule is used to determine which command should be time stamped based on which logical volume of the data storage system to which the command is directed.

41. The method of claim 1, wherein the predetermined rule is used to determine which command should be time stamped by matching an operation code of the command with a predefined code that indicates a time stamp should be requested.

42. The system of claim 15, wherein the predetermined rule is used to determine which command should be time stamped based on which logical volume of the data storage system to which the command is directed.

43. The system of claim 15, wherein the predetermined rule is used to determine which command should be time stamped by matching an operation code of the command with a predefined code that indicates a time stamp should be requested.

44. The method of claim 27, wherein the predetermined rule is used to determine which command should be time stamped based on which logical volume of the data storage system to which the command is directed.

45. The method of claim 27, wherein the predetermined rule is used to determine which command should be time stamped by matching an operation code of the command with a predefined code that indicates a time stamp should be requested.

46. A method for providing trusted time stamping for commands for a data storage system, the method comprising:
    determining a command executed in the data storage system;
    hashing information for the command to generate a hash value;
    sending the hash value and a request for a time stamp to a time stamping authority;
    receiving a time stamp token and a time stamping authority certificate from the time stamping authority, the time stamp token comprising a time stamp and the hash value;
    storing the time stamp token, the time stamp and hash value providing trusted time stamping mechanism for the command, and the command in a command log in the data storage system; and validating the time stamp token stored in the data storage system, including:
accessing the information for the command;
hashing the accessed information to generate a second hash value;
retrieving the hash value of the time stamp token by utilizing information associated with the time stamping authority certificate;
comparing the second hash value to the hash value found in the time stamp token which is stored in the data storage system; and
validating the time stamp token based on the comparison;
wherein determining a command includes determining whether command should be time stamped based on a predetermined rule; and
wherein the predetermined rule is whether the command is a command that proves when the data storage system starts to be used.

47. The method of claim 46, further comprising:
storing the time stamping authority certificate in the command log.

48. The method of claim 47, further comprising:
performing verification of a command based on information in the command log.

49. The method of claim 48, wherein verification of the command includes verifying when the command was executed based on time stamp information in the command log.

50. A method for providing trusted time stamping for commands for a data storage system, the method comprising:
determining a command executed in the data storage system;
hashing information for the command to generate a hash value;
sending the hash value and a request for a time stamp to a time stamping authority;
receiving a time stamp token and a time stamping authority certificate from the time stamping authority, the time stamp token comprising a time stamp and the hash value;
storing the time stamp token, the time stamp and hash value providing trusted time stamping mechanism for the command, and the command in a command log in the data storage system; and
validating the time stamp token stored in the data storage system, including:
accessing the information for the command;
hashing the accessed information to generate a second hash value; retrieving the hash value of the time stamp token by utilizing information associated with the time stamping authority certificate;
comparing the second hash value to the hash value found in the time stamp token which is stored in the data storage system; and
validating the time stamp token based on the comparison;
wherein determining a command includes determining whether command should be time stamped based on a predetermined rule; and
wherein the predetermined rule is whether the command is a specific storage management command.

51. The method of claim 50, further comprising:
storing the time stamping authority certificate in the command log.

52. The method of claim 51, further comprising:
performing verification of a command based on information in the command log.

53. The method of claim 52, wherein verification of the command includes verifying when the command was executed based on time stamp information in the command log.

54. The method of claim 1, further comprising:
storing the time stamping authority certificate in the command log.

55. The method of claim 54, further comprising:
performing verification of a command based on information in the command log.

56. The method of claim 55, wherein verification of the command includes verifying when the command was executed based on time stamp information in the command log.

57. The system of claim 15, wherein the command log stores the time stamping authority certificate.

58. The method of claim 27, further comprising:
storing the time stamping authority certificate in the command log.

59. The method of claim 58, further comprising:
performing verification of a command based on information in the command log.

60. The method of claim 59, wherein verification of the command includes verifying when the command was executed based on time stamp information in the command log.

* * * * *